United States Patent [19]

Dolza

[11] 4,050,589
[45] Sept. 27, 1977

[54] PIPE LAYING MACHINES

[76] Inventor: Claudio Dolza, Strada del Nobile, 39, Turin, Italy

[21] Appl. No.: 637,946

[22] Filed: Dec. 5, 1975

[30] Foreign Application Priority Data

Dec. 9, 1974 Italy .................................. 70565/74

[51] Int. Cl.² ............................................. B65G 7/00
[52] U.S. Cl. .................................. 214/1 PA; 212/14
[58] Field of Search .................. 214/1 P, 1 PA, 1 H; 212/14, 18, 56; 61/72.1, 72.5, 72.7

[56] References Cited

U.S. PATENT DOCUMENTS

| 732,908 | 7/1903 | Thomson ...................... 105/64 R X |
| 1,975,840 | 10/1934 | Geiger ........................... 105/64 R X |
| 3,090,494 | 5/1963 | Thiele ............................... 214/620 X |

FOREIGN PATENT DOCUMENTS

| 428,137 | 7/1967 | Switzerland .......................... 212/14 |
| 391,359 | 4/1933 | United Kingdom ................... 212/14 |
| 139,791 | 5/1961 | U.S.S.R. ............................... 212/14 |

*Primary Examiner*—Frank E. Werner
*Attorney, Agent, or Firm*—Scully, Scott, Murphy & Presser

[57] ABSTRACT

A pipe laying machine for laying large diameter pipes such as gas and oil pipelines, comprising a pair of self-propelled trucks carrying frames supporting a bridge which is adjustable in span and inclination and which carries a lifting device drivable across the bridge.

7 Claims, 6 Drawing Figures

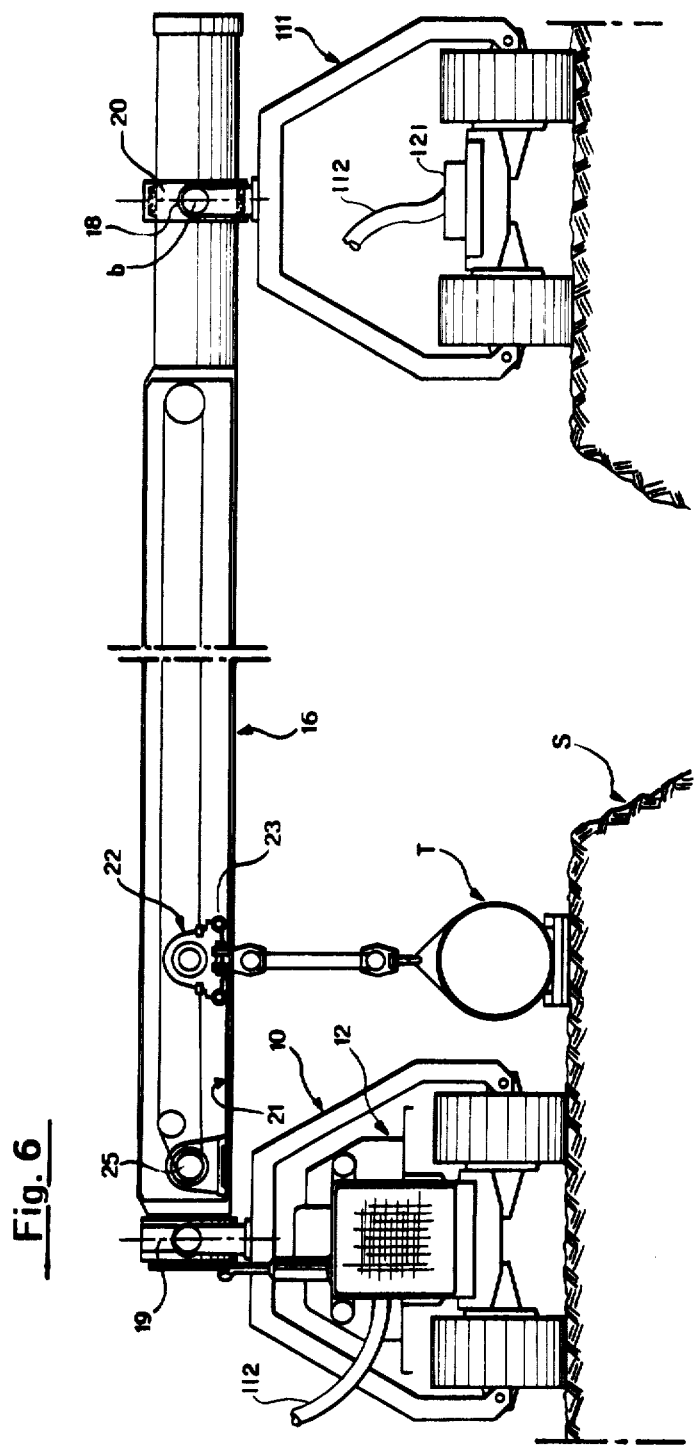

PIPE LAYING MACHINES

FIELD OF INVENTION

The invention relates to a pipe laying machine for laying into excavations metallic pipes of large diameter, especially oil and gas pipelines and the like. Metallic pipes of 50 up to 100 cm in diameter are utilized by juxtaposing pipe lengths and successively welding them together. Jointing operations, such as welding, inspections and subsequent auxiliary taping and water proofing are generally carried out outside the excavation on a terminal pipe length.

The operation is made possible by elastically deforming the pipe, so that the terminal length outside the excavation and the preceding one already laid down into the excavation will be assembled together through a curved length. The bending radius will be greater with increasing pipe diameter and wall thickness. Accordingly, with a large diameter pipe, the pipe length to be left outside the excavation will be of considerable length, for instance over 100 meters, this requiring high power lifting equipment for the subsequent laying down into the excavation.

In addition, further forces act on the length under consideration, deriving from its offset position, so that the laying operation becomes more complicated because of consequential lateral and axial thrusts.

In practice the laying operation as specified is carried out by means of self-propelled trucks provided with at least one cantilever crane boom travelling on a service track on one side of the excavation. In order to obtain balancing of the tilting moment, consequent to the cantilever disposition of the load and to the thrusts produced by the pipe misalignment, trucks of considerable size are employed, generally equipped with counterweights, which on the one hand reduce manoevrability, and on the other hand require the instalation of powerful driving units.

Furthermore, in order to reduce stresses, the service track must be carefully set on a level to follow minimal gradients, which considerably increases the total costs of the excavation. Nevertheless, in view of the cirumstances stated above, with pipelines of large diameters within the aforesaid limits, the length outside the excavation will be so heavy as to require the adoption of a plurality of lifting trucks arranged along the length of the pipe, so that the operations concerning both making and laying down the pipeline will be slow and expensive.

OBJECTS OF THE INVENTION

The main object of the present invention consists in providing a machine for laying into an excavation pipe lengths already jointed outside the excavation, so as to eliminate or at least to considerably reduce the aforesaid inconveniences.

More particularly, one of the objects of the present invention consists in providing a machine capable of absorbing and balancing the tilting moments as generated by the lifting thrusts of the pipe length under consideration, without making use of counterweights and utilizing a considerably lightened and simplified structure.

A further particular aim of the present invention consists in providing a pipe laying machine capable of travelling laterally to the excavation, for example in the case that no service track exists, also on sloping and/or slanting track and levelled in such a way as to make easier the setting operations as required by the excavation.

A further important object of the invention consists in providing a machine which can be adapted to laying pipe lengths of considerably different diameters into excavations having correspondingly different spans and depths.

A further object of the invention consists in providing a machine convenient for laying pipelines on steep ground.

Finally, the invention aims to provide a self-propelled machine equipped with interchangable modular power units, such as to permit the formation of a park, which on the one hand makes possible turnover maintainance and on the other hand, as it permits immediate replacement, any possible service interruption can be avoided in the event of failures or breakdowns.

BRIEF SUMMARY OF THE INVENTION

According to the invention, there is provided a pipe-laying machine for laying large diameter pipe into an excavation, comprising in combination:

two self propelled trucks adopted to traverse along the respective opposite banks of the excavation;

an upstanding supporting frame on each truck;

a transverse beam extending between the frame of the respective trucks to bridge the excavation;

means connecting the transverse beam with each of the two frames in such a manner as to permit the beam to adopt a variable inclination, at least one said connecting means permitting longitudinal sliding movement of the beam relative to the frame so that the beam can adopt a variable span;

a pipe lifting device supported by the beam; and means mounting the pipe lifting device for movement along the beam to traverse the width of the excavation which is bridged by the machine.

FURTHER FEATURES OF THE INVENTION

The connection of each beam end the corresponding truck is preferably made by means of an articulated member acting as a spherical joint, in such a way that the beam can assume any orientation, from axial rotations and angular shiftings at the joint in any plane. At least one of said articulated members carried also the corresponding end portion of said beam with the possibility of relative axial sliding therethrough.

The self-propelled trucks supporting the beam may be both provided with a power unit, independently controlled by a corresponding operator. According to a variant, one of the trucks is provided with a power unit, the second one only with movers which are energized by the power as generated by the first truck. The power units will advantageously consist in an hydraulic pump/thermic power group, said trucks being set in movement by means of transmission members of the hydrostatic type. BRIEF DESCRIPTION OF DRAWINGS Further features will appear from the following detailed specification, with reference to the accompanying drawings, as given by the way of non-limitative example, in which:

FIG. 6 is a front elevation, like FIG. 1, but showing a variant of the machine.

DESCRIPTION OF EMBODIMENT

Figure 1:
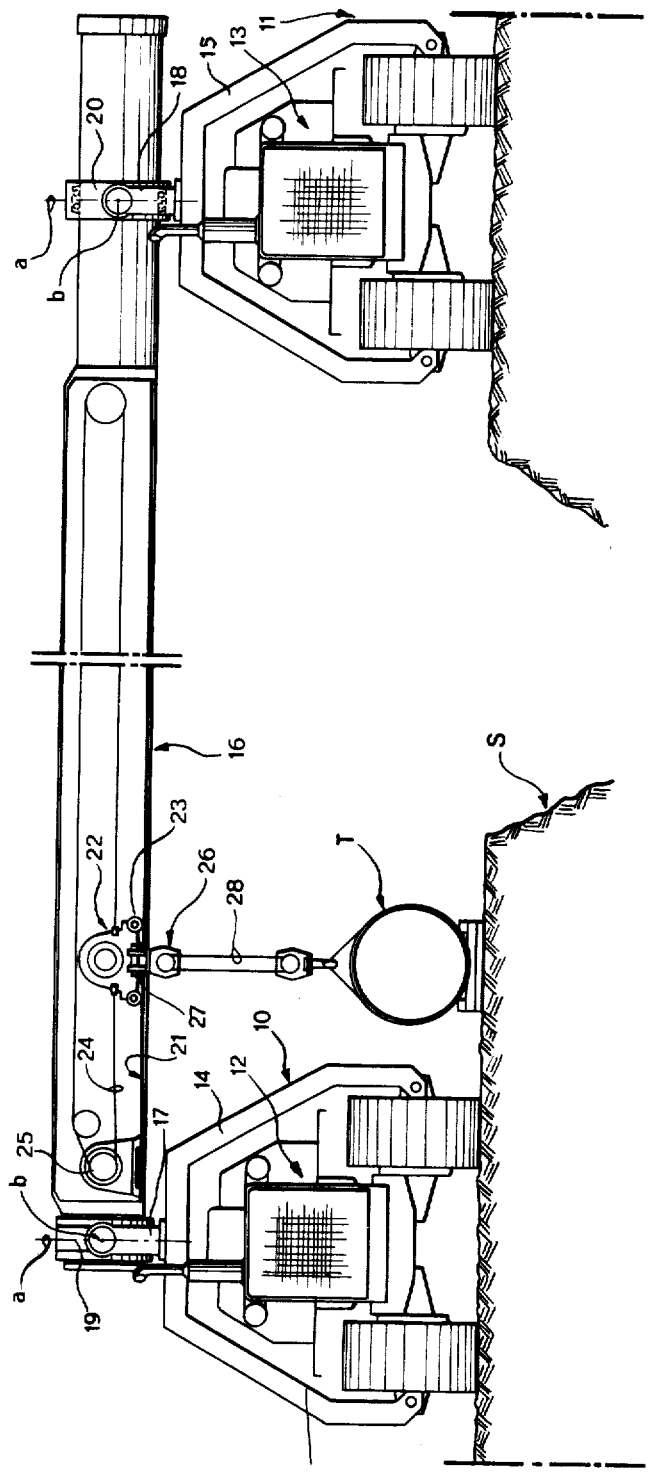
FIG. 1 is a front elevation of a machine according to invention.

With reference to FIGS. 1 to 5, numerals 10 and 11 show two self-propelled tracked trucks, foreseen to traverse along both sides of an excavation S, into which must be laid down a pipe length T, still laying aside the excavation.

Each truck is provided with a power unit 12, respectively 13, including a thermic engine, one or more hydraulic pumps and traction members of the hydrostatic type for the controlled operation of the trucks. Each truck is also provided with a frame 14, respectively 15, for the articulated support of an upper transverse beam 16.

Said frame will advantageously consist in a couple of portal standards connected at their bottom to the base structure of the trucks and converging to upper member carrying the articulation for the end portion of the beam 16. Said articulation is of the spherical joint type, essentially consisting, for both trucks, in a fork 17, respectively 18, rotatably supported by the frame around an axis $a$, perpendicular to the base plane of the truck; a ring 19, respectively 20, being connected to said fork, angularly oscillating around an axis $b$, which is orthogonal to the above said axis $a$.

The beam is supported by both said rings and is capable of rotating around its axis; furthermore, the connection of the ring 20 to the beam is carried out by interposition of rolling members, for instance balls or rollers, in such a way that the beam can also slide axially through the ring. Said beam 16 is hollow and is provided with slideways 21 for a lifting member 22, capable of carrying out controlled axial traverse.

According to the embodiment as shown in the drawings, the member 22 consists in a winch supported by a truck provided with wheels 23 engaging the slideways 21, said winch being subjected to the action of a traction rope 24, operated by a capstan 25, which is remote-controlled from the operating cab of the truck 10 and/or 11. Also the winch 22 of the lifting member is remote-controlled from the operating cab of the trucks or from both trucks, the remote-control being of course of the reciprocal exclusion type.

The lifting hoist 26, as associated with the winch 22, is advantageously connected to the winch itself through a link consisting in a hinge 27 with a horizontal axis; accordingly, the load can shift in the vertical plane, parallel to the longitudinal direction of the trucks. Furthermore, due to the lifting ropes 28, the load can assume an angularity in the front plane perpendicular to the above mentioned one, in such a way that from the combination of the two movements will result the possibility of angular shifting of the load within a cone the vertex of which lies on the axis of the hinge 27 and the half aperture of said cone being about 20°.

Due to the articulations interposed between the end of the beam 16 and the trucks 10–11, the machine according to invention offers several possibilities of use, which make it suitable for laying pipelines on very broken and uneven ground, free from dangerous stresses as far as the stability of the machine is concerned.

Figure 2:
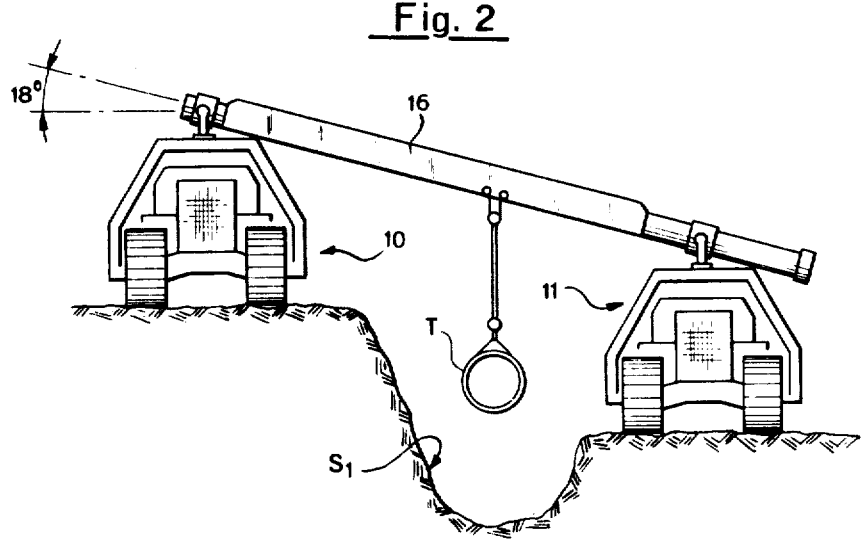
FIGS. 2 and 3 are schematic elevation views showing two different possibilities of using the machine.
Figure 3:
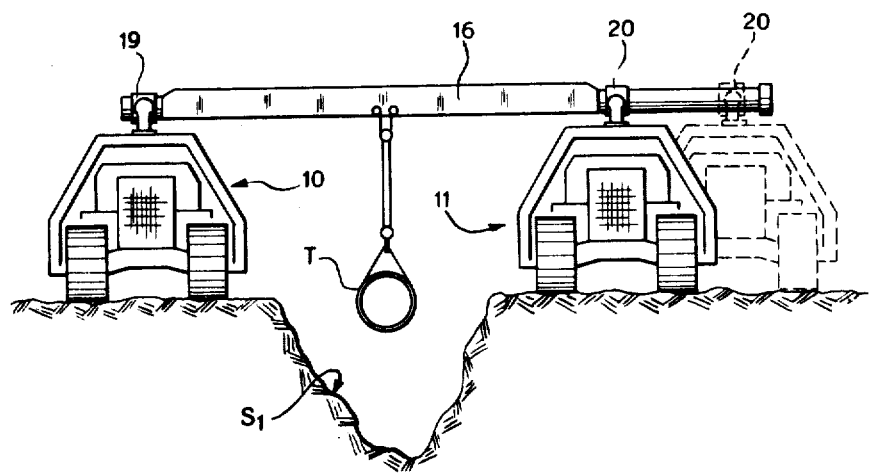
Figure 4:
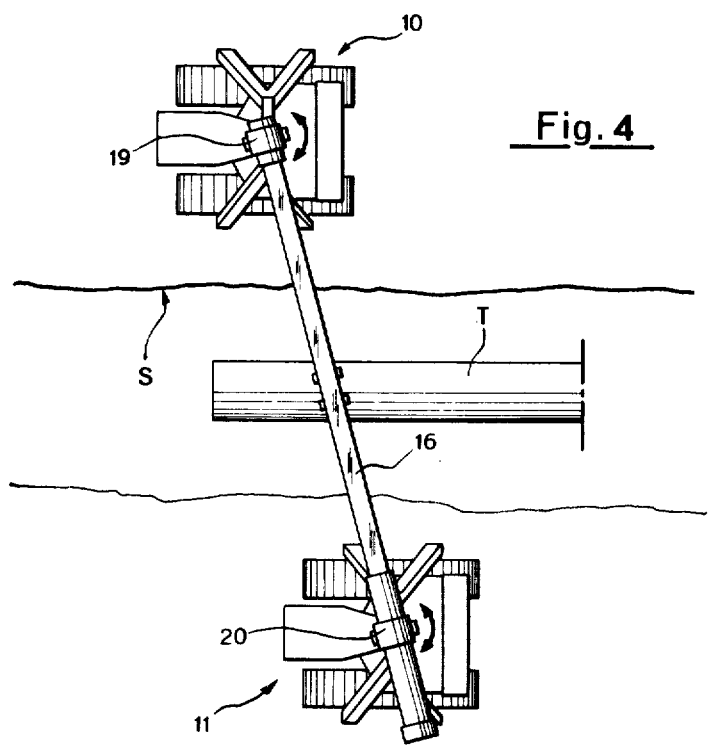
FIG. 4 is a plan view showing a further possibility of using the machine.

FIG. 2 shows by way of example the working mode of the machine for laying a pipe T into an excavation $S_1$.

characterized by the presence of embankments on different levels. In such a case the beam will be slanting, as shown in the drawings, due to angular rotation around the axis $b$ of the connecting articulations; the gradient ranging from 15° to 25°. On the contrary, FIG. 3 shows the possibility of varying the span between the two trucks, due to the axial sliding of the beam ends with reference to the supporting ring 20. FIG. 4 shows the angular shifting possibility of the beam in a horizontal plane, due to the rotation of the forks 17–18 around their hinge axis $a$.

Figure 5:
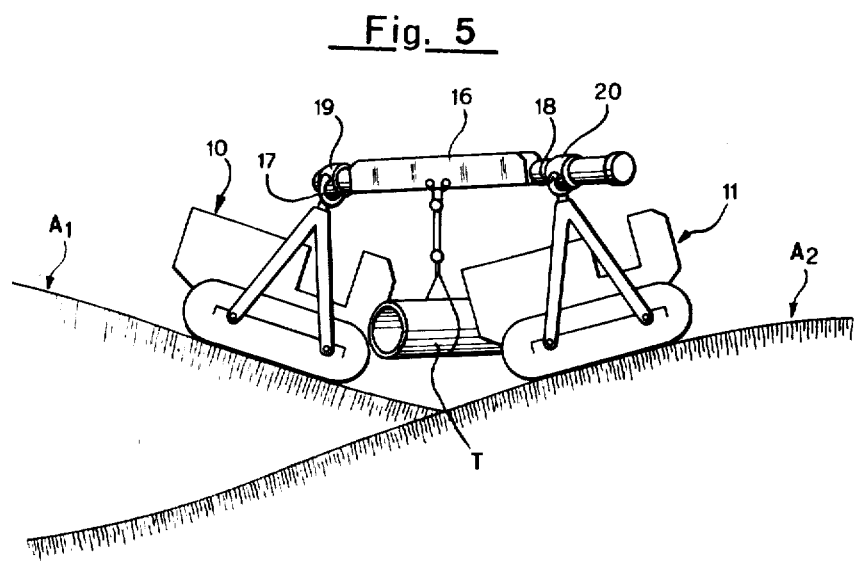
FIG. 5 is a elevation showing a further possibility of using the machine.

Finally FIG. 5 shows the possibility of using the machine for laying a pipe T into an excavation, the gradients of the embankments $A_1$–$A_2$ being opposite in sign.

In all the cases as exemplified above, the centre-of-gravity perpendicular of the unit machine/pipe falls within the tread as defined by the contact points of the trucks on the ground, this fact improving the stability arising due to tilting couples and lateral thrusts and permitting, in accordance with the objects of the invention, to avoid use of counterweights and to substantially reduce the weight of the trucks.

According to the variant shown in FIG. 6, in which similar or corresponding parts are indicated by the same reference numerals, the machine includes a truck 10 equipped with a self-containing power unit 12 and a truck 111, the latter provided only with the above said hydrostatic traction movers 121. In such a case said truck 111, which is also self-contained, derives the power necessary to energize its hydraulic motors from the pump of the power unit of the truck 12. Connection and control pips 112 are supported by said beam 16. Furthermore, automatic control members, sensitive to the orientation adopted by the beam 16 in the horizontal plane, will preferably be adopted in view to safeguard the self-aligning of the trucks during their traverse.

It is a matter of course that, taking for granted the principle of the invention, the details of the ways of carrying out the invention can widely vary in relation to the specification above and the accompanying drawings without departing from the scope of the invention as defined in the appended claims. Thus, for example, the traverse control of the winch 22 can be carried out by means of hydraulic, pneumatic or electric actuators, according to arrangements of conventional type. As to the beam 16, it can be made of a tubular cylindrical profile or in the form of a framework of convenient section, provided that it is equipped with articulations to perform the functions specified above.

I claim:

1. A pipe-laying machine for laying large diameter pipe into an excavation, comprising in combination:
   two self-propelled trucks adapted to traverse along the respective opposite banks of the excavation;
   an upstanding supporting frame on each truck;
   a transverse beam extending between the frames of the respective trucks to bridge the excavation;
   means connecting the transverse beam with each of the two frames in such a manner as to permit the beam to adopt a variable inclination, at least one said connecting means permitting longitudinal sliding movement of the beam relative to the frame so that the beam can adopt a variable span, each connecting means comprising an articulation member in the form of a spherical joint consisting of a fork rotatably supported by the frame around an axis perpendicular to the base plane of the truck, said fork carrying a pivotably mounted ring capable of angular movement around an axis orthogonal to the first axis, whereby to permit the beam to assume any orientation relative to the vertical and horizontal planes, and the beam being supported by the pivotably mounted rings to be capable of rotating its own axis;

a pipe lifting device supported by the beam; and means mounting the pipe lifting device for movement along the beam to traverse the width of the excavation which is bridged by the machine.

2. A machine according to claim 1, in which at least one ring of the articulated connection engages a corresponding end portion of the transverse beam by interposition of rolling members, in such a way that the beam can slide axially through the ring.

3. A machine according to claim 1, in which at least one of said articulation members supports the beam in such a manner as to permit relative sliding of the beam therethrough.

4. A machine according to claim 1, in which the frame of each self-propelled truck comprises a pair of portal standards, connected at their lower ends to the base structure of the truck and converging towards an upper member carrying the connecting means for the transverse beam.

5. A machine according to claim 1, in which the lifting member consists of a winch supported by a carriage travelling on two slideways on the transverse beam and subject to the action of traction means controllable by remote control means from at least one of the self-propelled trucks.

6. A machine according to claim 1, in which the self-propelled trucks supporting the beams are each provided with a power unit, which is autonomously controllable by a corresponding operator.

7. A machine according to claim 1, in which one of the self-propelled trucks is provided with a hydraulic power unit, the other truck with hydraulic movers which are energized by hydraulic power generated by the first truck.

* * * * *